July 28, 1953    J. D. STRONG    2,646,650
METHOD, MACHINE, AND TOOL FOR LAPPING
DIVIDING HEADS AND GEARS
Filed Nov. 5, 1949    3 Sheets-Sheet 1
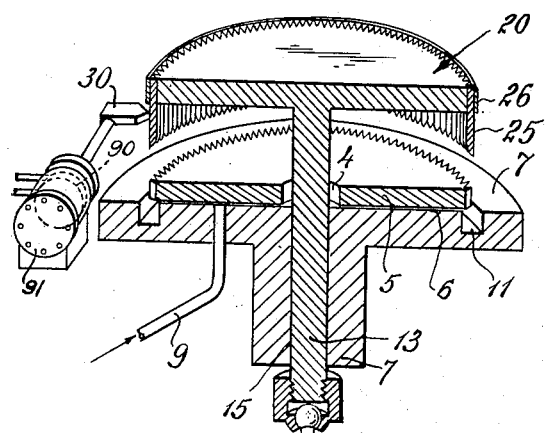
Fig. 1.
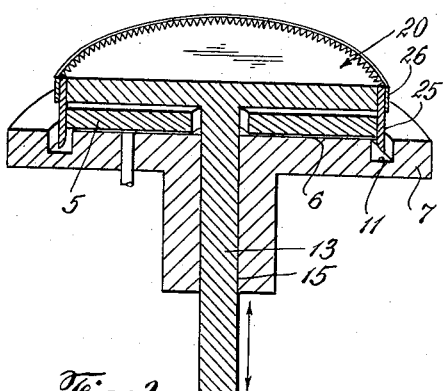
Fig. 2.
Fig. 3.
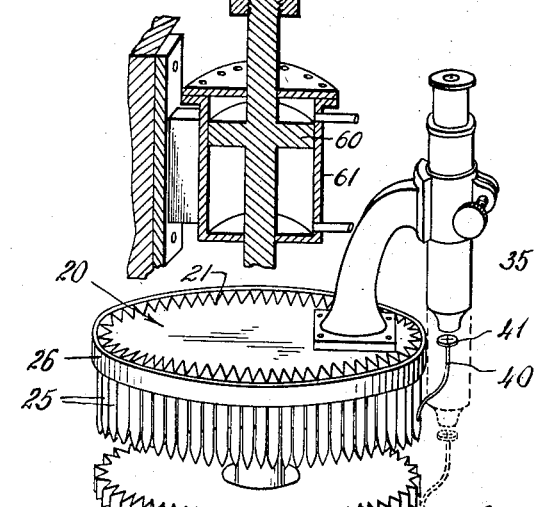
Fig. 4.
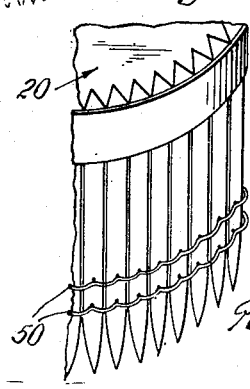
Fig. 8.
INVENTOR.
JOHN D. STRONG
BY
Pennie, Edmonds, Morton and Barrows
ATTORNEYS

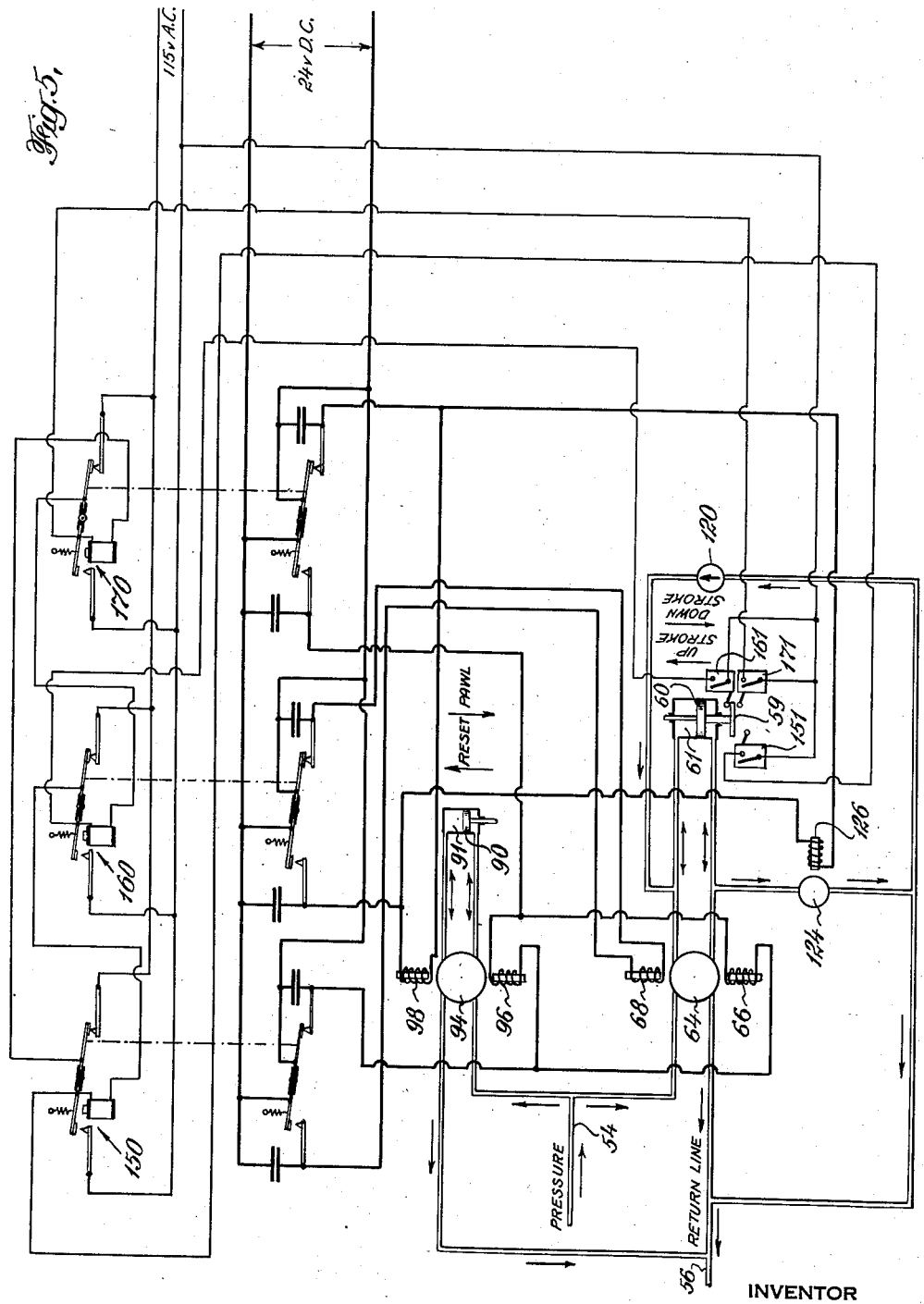

July 28, 1953
J. D. STRONG
2,646,650
METHOD, MACHINE, AND TOOL FOR LAPPING
DIVIDING HEADS AND GEARS
Filed Nov. 5, 1949
3 Sheets-Sheet 3
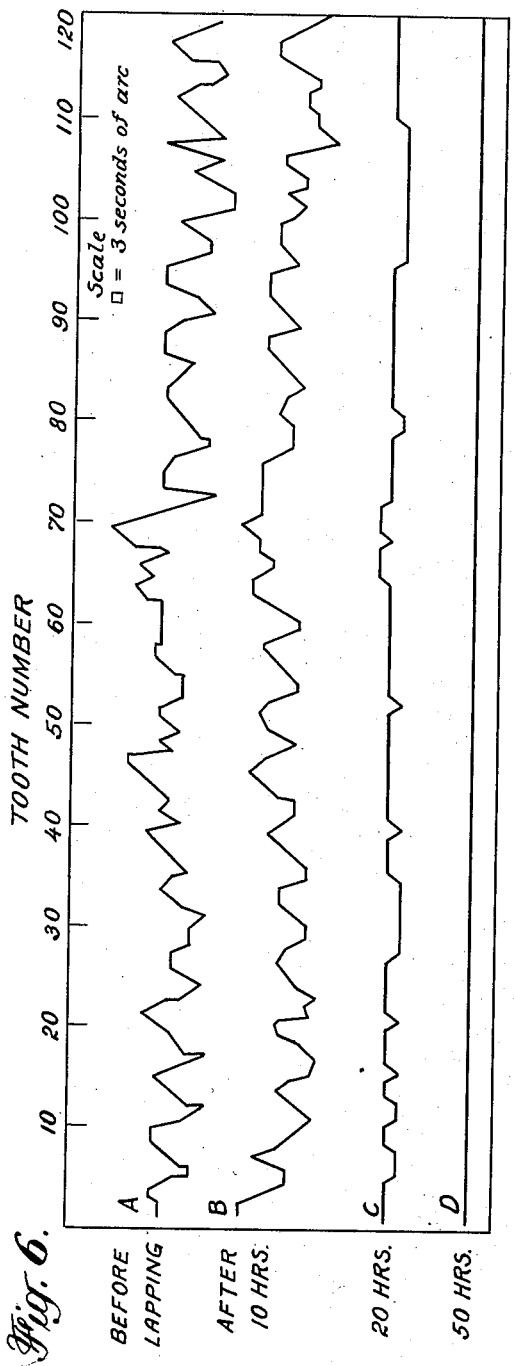
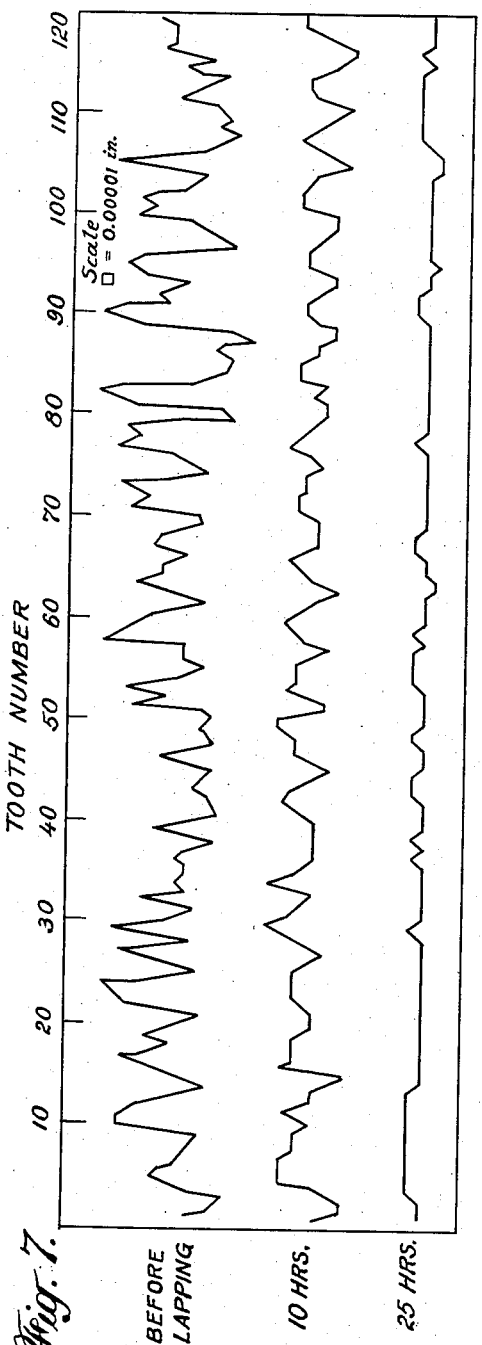
INVENTOR.
JOHN D. STRONG
BY
Pennie, Edmonds, Morton and Barrows
ATTORNEYS Patented July 28, 1953

2,646,650

UNITED STATES PATENT OFFICE 2,646,650

METHOD, MACHINE, AND TOOL FOR LAPPING DIVIDING HEADS AND GEARS

John D. Strong, Baltimore, Md.

Application November 5, 1949, Serial No. 125,790

10 Claims. (Cl. 51—59)

This invention relates to the generation of dividing heads or gears for use in dividing engines, ruling engines, and elsewhere where perfectly divided circles are useful.

In a ruling engine for the manufacture of diffraction gratings, for example, it is important to possess a toothed wheel of perfect shape. That is, the addendum and root circles which circumscribe the teeth must be perfect circles concentric with each other, and the pitch of the separate teeth must be exactly uniform.

In a ruling engine the dividing head is employed in conjunction with a precisely manufactured screw and nut to advance the grating and the ruling tool relative to each other between strokes. The dividing head is affxed to the shaft which carries the screw, and the advance of the grating relative to the ruling tool is produced by rotating the dividing head and the screw through a fixed angle at each stroke. This rotation is produced by a pawl which rotates the dividing head through the angle of one tooth. The spacing of the rulings on the grating must be as uniform as possible, and to this end a dividing head with the least possible error is desired, in order that the screw may always be rotated through the same angle between strokes.

Heretofore, errors of the order of one second of arc in the pitch of the individual teeth have been considered typical of good quality dividing heads. With the present invention, dividing heads may be produced in which the errors in tooth spacing and pitch diameter are not detectable.

The present method of dividing derives from a process of laping the teeth on a carefully cut gear with a tool which laps all the teeth at each stroke and which is shifted at each stroke by one tooth. In this way, each tooth of the gear or dividing head is successively lapped by all of the laps of the tool. The separate laps, one for each tooth on the dividing head, are elastically interconnected by the tool on which they are mounted. That is to say, the lapping process is begun with a blank arcuate enough so that the laps on the tool are not flexed beyond their elastic limit even at the outset of the lapping operation.

With such a tool the errors in the teeth are reduced and all teeth are lapped towards a mean which is a perfect circle, regardless, within limits, of the errors in the tool.

The truth of this principle will be apparent from the following considerations. A perfect circle, when rotated in its plane about an eccentric point, will exhibit a sinusoidal error in its position at a given bearing in the frame of reference with respect to which the circle is rotated. Similarly a perfect dividing head when mounted eccentrically and advanced by a pawl engaging its teeth one at a time, will produce a sinusoidal error in the shaft it rotates. If however the position of the circle is read at diametrically opposite positions, by means of a pair of microscopes for example, and if the readings are averaged to determine the rotation of the circle, the error of one reading will cancel that of the other. Likewise, a dividing head actuated by two diametrically opposite pawls which are elastically interconnected, rotates its shaft free from sinusoidal error. If instead of two pawls elastically interconnected there are as many pawls as teeth, and if all these pawls are elastically interconnected and act simultaneously, the dividing head they control will rotate uniformly independently of any eccentricity of mounting. In addition, errors in the pitch of the individual teeth, instead of being reflected directly into the rotation of the head, will be reduced by a factor equal to the number of pawls employed.

Instead of rotating an imperfect head by mechanism empolying a multiplicity of interconnected pawls, I remove the errors from the head by dressing it with a tool having such a multiplicity of interconnected pawls, i. e. laps, charged with abrasive. Each of the laps is urged by its connection with all the rest to assume the correct position with reference to all the rest and dresses the teeth of the head with which it comes in contact accordingly. If the relative position of the tool and head is changed from stroke to stroke, each lap thus dresses each tooth as required by the position of all the other laps and each lap is dressed by each tooth. As the lapping is continued, a process of mutual betterment takes place between the tool and the head, teeth which have been improved in position by previous strokes correcting more and more the position of egregious laps and vice versa.

Thus according to my invention a perfect dividing head is generated by means of a lapping tool including as many laps as there are teeth on the head, the tool being shifted at each stroke by one tooth, so that each lap is employed to dress each tooth. If the head has 360 teeth, 360 strokes of the tool bring each lap into contact with each tooth once. The process is continued until no further cutting occurs.

My invention will now be described with reference to the accompanying drawings, in which:

Fig. 1 is a partial perspective view of a dividing head in process of manufacture according to the present invention. The head is supported in a lapping machine in which the lapping tool is shown in raised position where it is pawled between strokes;

Fig. 2 is a view similar to that of Fig. 1 but showing the lapping tool in lowered position where it engages the head to be dressed;

Fig. 3 is an enlarged partial perspective view of the tool;

Fig. 4 shows the method of measuring the errors remaining in the individual teeth of a head at any stage in the process of lapping;

Fig. 5 is a diagram of a hydraulic and electric system suitable for driving the lapping machine shown in Fig. 1;

Fig. 6 is a graph showing the improvement in tooth spacing produced by use of the method and tool of my invention;

Fig. 7 is a graph showing the improvement in pitch diameter of a head produced by use of the method and tool of my invention; and Fig. 8 shows a modification of my invention.

In Fig. 1 an unfinished dividing head 5 is shown in partial perspective, supported upon a flat plate 7. The head 5 rests upon a film of oil 6 maintained by one or more oil pumps, not shown, which deliver a metered quantity of oil to the interface between the head and its support through oil tubes 9 passing through the support plate 7. Three such oil tubes, disposed at equal angular intervals around the center of the support plate 7, have proven satisfactory. The support has an annular channel 11 to provide clearance for the laps of the tool when in lowered position and for collection of the oil which flows out at the periphery of the dividing head. The dividing head has a hole 4 at its center for later accommodation of the shaft to which it is to be fastened. During the lapping process, the stem 13 of the lapping tool, passes through this aperture and down through a close fitting bearing 15 which is accurately perpendicular to the surface of the support plate 7.

The head 5 therefore floats on a film of oil above the support plate and is, within limits which are wide for the purposes of the lapping process, unconstrained as to either translational or rotational movement in the plane of the support plate 7.

The lapping operation is performed with the help of a tool generally indicated at 20. The tool consists, as further shown in Fig. 3, of a circular plate 21 having affixed to its periphery a plurality of laps 25 extending perpendicularly to the plate 21. For connection to the driving mechanism, the plate is affixed to an accurately perpendicular stem or shaft 13. The laps are disposed at equal angular intervals about the rim of the plate 21 in the same number as there are teeth in the head 5 to be finished.

The tool is advantageously constructed from a previously finished dividing head, with the laps fastened in the spaces between its teeth, as shown in Fig. 3. The laps are made of mild steel, with a smooth finish and a triangular prismatic shape, except for a taper at the lower end. The laps are of such length as to extend, exclusive of their tapered portion, beyond the disk-shaped plate 21 by a distance at least as great as the thickness of the head 5 to be lapped. They are held in place by means of an encircling band 26, and soldered to the plate 21 in a circular array so that the tool forms a rigid body, the separate laps of which are, for small flexures, elastically interconnected by the plate 21. The laps are sprung radially inward by a small amount so that when the tool is in raised position as in Fig. 1, the laps at their lower portions conform to a circle slightly smaller than that to which the teeth of the finished dividing head are to conform. The axes of the laps, i. e. axes perpendicular to their triangular sections, therefore extend substantially parallel to the stem or shaft 13 and hence to a line passing through the center of the circular array of laps as they are fastened to the plate 21, said line being perpendicular to the plane of this circular array.

In operation, the tool is lifted from below by a mechanism connected with the stem 13. In its uppermost position a pawling mechanism, including a pawl 30, rotates the tool through an angle equal to the pitch of one lap. The tool is then lowered and the separate laps 25 engage the faces of the teeth of the head 5. Since the laps are triangular in section, as shown in Fig. 3, both faces of all teeth are lapped simultaneously. The head 5 floating on the oil film 6 adopts the position imposed upon it by the balance of forces exerted by the separate laps. When the tool is again raised, the lapping action is continued during the upward drive of the tool. The tool is then advanced through the angle corresponding to one tooth on the head and the lapping stroke is repeated, the pawling mechanism being synchronized with the drive which periodically raises the tool by pressure on the stem 13. In the embodiment illustrated in Fig. 1 the tool 20 is raised and lowered by means of a piston 60 connected with the stem 13 by suitable means such as the link 62. The piston works in a cylinder 61, and is actuated by a hydraulic fluid, admitted under pressure first to one and then to the other side.

The pawl 30 is actuated by a similar piston 90 working in a cylinder 91. The operation of the piston 90 is controlled to pawl the tool while in raised position out of engagement with the workpiece. The pawl is reset by reversing the application of pressure to the piston 90 while the tool engages the workpiece.

A mechanism suitable for driving and pawling the tool is shown in Fig. 5. The cylinders 61 and 91 connect, respectively, through solenoid-operated valves 64 and 94 with a hydraulic system having a high pressure line 54 and a low pressure line 56. The valves 64 and 94 have upper actuating coils 68 and 98, respectively, and lower actuating coils 66 and 96, respectively. When neither coil is energized, the valve in each case is closed, and no fluid can flow through the valve to or from either side of its associated piston. When the upper coils are energized, the valves permit crossflow, driving piston 60 in the direction marked "up stroke" in the case of valve 64 and moving piston 99 in the direction marked "pawl" in the case of valve 94. When the lower coils are energized, straight through flow is established, driving piston 60 in the direction marked "down stroke" and moving piston 90 in the direction marked "reset."

In addition a check valve 120 is connected between the low pressure line 56 and the upper side of piston 60 permitting flow to the upper side only, and a solenoid-operated by-pass valve 124 establishes, when energized, a connection between the lower side of piston 60 and the low pressure line.

The solenoid valves are operated by means of four-pole relays 150, 160 and 170, having the normal positions shown in the figure. Each pole of each relay is insulated from all the other poles. One pair of poles on each relay are employed to actuate the solenoid valves from a D. C. circuit, in the embodiment shown, while the other pairs of poles are employed in a control circuit for controlling the positions of the relays. The control circuit is energized with alternating current in the embodiment shown.

The relays are shifted from their normal to their energized positions upon the operation of microswitches 151, 161 and 171 when closed by a cam 59 affixed to the piston 60 and under certain other limitations established by the interconnections of the control circuit.

The connections of the control circuit are so established that for relay 150 to be energized, relay 160 must be de-energized; for relay 160 to be energized, relay 170 must be de-energized; and for relay 170 to be energized, relay 150 must be de-energized. Whenever the circuit for energizing one of the relays is established through its microswitch, a holding circuit is established which will keep the relay energized until the associated relay as above indicated is energized to break the holding circuit.

In the D. C. circuit, lower coils 66 and 96 are seen to be connected in a parallel branch between the normally closed D. C. contacts of relay 150 and the normally open D. C. contacts of relay 170. Coil 98 of valve 94 and coil 126 of by-pass valve 124 are in a similar parallel branch between the normally open D. C. contacts of relay 160 and the normally closed D. C. contacts of relay 170. Upper coil 68 of valve 64 is connected between the normally open D. C. contacts of relay 150 and the normally closed D. C. contacts of relay 160.

The microswitches 151, 161 and 171 are positioned to be engaged by cam 59, respectively, at the lower end of the travel of piston 60, at the upper end of its travel, and (approximately) at the point where mesh is established between the tool 20 and the workpiece in the course of the down travel of the tool.

The cycle of operation can now be described.

Assume piston 60 to be traveling downwardly, the cam 59 approaching the switch 151. Relays 150 and 160 are in normal position, and relay 170 is energized. Accordingly coils 66 and 96 are energized; the valves 64 and 94 are in straight through flow position; the pawl 30 has been reset by piston 90; and valve 124 is closed. Piston 60 is being driven downwards.

When switch 151 is closed, relay 150 is energized through the normally closed A. C. contacts of relay 160, which is de-energized. Relay 170 returns to normal position, breaking the circuit to coils 66 and 96. Valves 64 and 94 then return to closed position. Coil 68 is energized through the D. C. contacts of relays 150 and 160, and crossflow is established through valve 64, raising piston 60 and the tool 20 with it. Closing of switch 171 by the cam 59 during upward travel of piston 60 is without effect since relay 150 is energized and no circuit for relay 170 can be established.

When switch 161 is closed however, relay 160 is energized through the normally closed A. C. contacts of relay 170. This de-energizes relay 150, which returns to normal position. Coil 68 is then de-energized, and valve 64 closes, ending the upward travel of piston 60. Coil 98 is energized, and the tool is pawled by piston 90 due to crossflow through valve 94. At the same time coil 126 is energized, opening by-pass valve 124. Piston 60 and its connected tool then descend slowly under the influence of gravity until the laps 25 engage the workpiece (Fig. 1). If proper mesh is established, the piston 60 can descend sufficiently to close switch 171. When switch 171 closes, relay 170 is energized through the now closed normally closed A. C. contacts of relay 150. Relay 160 returns to the normal position, and valves 94 and 124 close in consequence. Energization of relay 170 establishes a circuit through coils 96 and 66. The pawl 30 is then reset by piston 90, and power is applied through valve 64 to drive the piston 60 downwards.

By delaying the application of power for the down stroke on piston 60 until the tool falls under gravity to a position indicating proper mesh between tool and workpiece, damage due to improper mesh is prevented. The pointed laps of the tool correct any slight error in indexing of the tool with respect to the piece so that the angle of pawling is not critical.

Of course a large number of arrangements may be devised to drive and pawl the tool in proper sequence. The circuit illustrated is exemplary only and in no way forms a limitation on the scope of my invention.

During dressing, the differential pressures exerted by the separate laps are such that the tooth faces on each tooth of the head are differentially lapped by just the amounts necessary to obtain uniform spacing of the teeth radially and circumferentially around the dividing head 5. The progress of the work is entirely automatic, and the operator of the machine need only add abrasive material from time to time as necessary in the course of the work. Both the tool and the workpiece improve in shape.

The correction of tangential errors in the position of the teeth of the head proceeds from the fact that the two laps which fit on either side of an erratically positioned tooth will assume the position imposed upon them by the laps which engage the other teeth of the head. The two laps in question will therefore combine to dress most the side of the erratically positioned tooth which is farthest from its correct tangential position, moving the center of that tooth towards its correct position. Although there may be many erratic teeth, the dividing head and the tool will be repeatedly relocated at positions which differ from each other successively by exactly the average angular size of one tooth.

As regards radial errors both sides of teeth projecting beyond the desired circle are dressed since such teeth spring abnormally the two laps which they engage. As in the case of the correction of tangential errors, the correct radial positions of any two laps such as those engaging a protruding tooth are correctly defined by the multiplicity of other laps to which they are connnected. The lapping operation is begun with a head which is slightly oversized so that a small amount of material is to be removed from all teeth.

Errors in the tool are diminished by the fact that the tool is rotated with respect to the workpiece. Incorrectly placed or dimensioned laps therefore experience a dressing action, even from correctly placed teeth. This dressing action corrects the size and position of such laps and reduces the action which they take on teeth which they subsequently engage.

Errors in the concentricity of the dividing head as finally dressed and the central hole 4 are not important. By means of a spider mounting between this hole and a shaft of smaller diameter, the dividing head may be mounted concentrically with its shaft, or a controlled amount of eccentricity may be introduced through the spider in order to cancel other periodic errors in the machine in which the head is to be employed, for example in the pitch of the screw of a ruling engine.

The improvement achieved is illustrated in Figs. 6 and 7. In Fig. 6 curve A plots variation from the mean in the circumferential spacing of 120 of the 360 teeth of a typical head, before treatment according to my invention. Variation in seconds of arc is plotted vertically against the tooth number shown horizontally. Curve B represents corresponding data after a ten-hour lapping period, C the data after twenty hours of lapping, and D that after fifty hours of lapping. Thus, the extreme variation has been reduced from something like thirty seconds of arc to a level at which no variations can be detected.

Fig. 7 is a similar plot, showing variations in pitch diameter of the head before and after lapping. The data from which the curves of Figs. 6 and 7 were plotted were obtained by the measuring technique diagrammatically illustrated in Fig. 4. Here a low power microscope 35, equipped with an eyepiece scale, is shown mounted on the plate 21 of the lapping tool. With this microscope both radial and circumferential errors of the separate teeth of the head may be observed by noting the flexures which they impose upon a lap. Directly beneath the microscope a test wire 40, affixed to a lap and having an index cross 41 at its head, brings the flexure of the lap directly into the field of view of the microscope. Since the microscope is affixed to the tool, the position of the microscope itself conforms to the mean circle defined by all the laps acting on all the teeth including that under observation. By means of calibrated cross hairs, it is possible to read directly from the motion of the wire 41, the radial and circumferential errors of the tooth under observation. Negative radial errors are readable from the fact that the laps are sprung radially inward by a small amount, so that a tooth of correct size will spring the lap carrying the test wire outwards a small distance. Correspondingly, an undersized tooth will fail to do so.

In Fig. 8 a modification of my invention is illustrated in which the laps, while elastically interconnected through the plate 21 of the lapping tool are further inelastically connected close to their tips by means of lead wires 50. The lead wires accelerate the lapping process since they slow down the elastic response of the laps.

In describing my invention I have discussed a dividing head having 360 teeth and have stated that the head and tool are advanced relative to each other by one tooth at each stroke. Of course my invention is applicable to heads having any desired number of teeth, and one or more strokes may be taken in lapping before shifting the tool relative to the head. The tool and head may also be shifted relative to each other by more than one tooth. The shifting however should be performed in regular fashion, and by such a number of teeth as will bring each lap of the tool into contact with each tooth of the head.

Of course the omission from the tool of a small number of laps, whether intentionally or as a result of breakage for example, does not render the invention inoperative and the appended claims are to be construed in the light of this fact. Also, although it is preferable, it is not necessary that the teeth be parallel to the axis of the dividing head. For example, a head with teeth inclined at a small helix angle can be lapped by my method.

I claim:
1. A machine for generating a dividing head comprising a support, means to maintain a film of oil on the face of the support, a lapping tool of circular shape having affixed to its periphery a set of prismatic laps, one for each tooth on the head to be divided, the laps being of generally prismatic shape and having a cross-section equal to the intended space between adjacent teeth of the dividing head, means to reciprocate the tool with respect to the support along a direction perpendicular to the support, and means to rotate the tool with reference to the support through the angular interval corresponding to a given number of laps at time intervals corresponding to a given number of strokes of the tool.

2. A machine for generating a dividing head comprising a support on which the head to be divided is to rest, means to maintain a film of oil between the surface of the support and the head resting thereon, a dividing tool including a toothed wheel having the number of teeth to be imparted to the dividing head and a lap of triangular cross-section affixed between each pair of adjacent teeth of the toothed wheel, the laps extending parallel to the axis of the toothed wheel, and means to reciprocate the dividing tool in a direction perpendicular to the support and to shift the angular orientation of the tool with respect to the dividing head in a regular fashion.

3. The method of generating a dividing head which comprises floating a rough-cut wheel having the desired number of teeth on a film of oil free of constaints against translational and rotational motion in the plane of the oil film, lapping the teeth with a tool including a lap for each tooth of the wheel, and advancing the angular orientation of the tool with respect to the wheel by one lap at each stroke.

4. The method of generating a dividing head which comprises floating a blank toothed wheel to be divided on a film of oil unrestrained as to small translations and rotations in the horizontal plane, simultaneously lapping all the teeth of the blank by means of a tool including a lap for each tooth of the blank, the said laps being elastically interconnected by affixation to a common support, and advancing the tool in regular fashion with respect to the blank as the lapping progresses so as to bring each lap of the tool repeatedly into contact with each tooth of the wheel.

5. The method of generating a gear which comprises floating a rough cut wheel having the desired number of teeth on a film of oil free of constraint against translation and rotation in the plane of the oil film, lapping the teeth of the gear with a tool including a plurality of elastically interconnected laps each engaging at each stroke the two adjacent faces of two adjacent teeth on the wheel, and advancing the angular orientation of the tool with respect to the wheel in regular fashion.

6. A machine for generating a dividing head comprising a support, means to maintain a film of oil on the face of the support, a lapping tool of circular shape having affixed to its periphery a set of prismatic laps, said laps being affixed to the support in an array substantially identical to the circumferential position of the intended spaces between adjacent teeth of the dividing head, means to reciprocate the tool with respect to the support along a direction perpendicular to the support, and means to rotate the tool with reference to the support through the angular interval corresponding to a given number of laps at time intervals corresponding to a given number of strokes of the tool.

7. A tool for lapping the teeth of gears comprising a plurality of elastic laps and means rigidly supporting said laps at one end thereof with said ends in a circular array and with the axes of said laps substantially parallel to the line which passes through the center of the circle to which said array conforms and which line is perpendicular to the plane of said circle, said laps having a constant triangular section over a portion of the length thereof extending from said supporting means by a distance not less than the thickness of a gear to be lapped and having beyond said portion a triangular section tapering outwardly from the sides closest the center of said circular array towards the ends of the laps remote from their supported ends to facilitate entrance of said ends of the laps into the notches between the teeth of gears to be lapped, said laps being bounded over said portion of their length on the side thereof facing the center of said array by two plane dressing faces conforming to the surfaces to be imparted to the adjacent faces of two adjacent teeth on said gear.

8. A tool for lapping the teeth of gears comprising a plurality of metallic laps and means supporting said laps at one end thereof in a substantially cylindrical array, said laps being bounded over a portion of their length on the side thereof facing the axis of said array by two plane dressing faces conforming to the surfaces to be imparted to the adjacent faces of two adjacent teeth on a gear, said laps at their other ends each being tapered outwardly from the sides closest the axis of said cylindrical array towards the ends of the laps remote from their supported ends to facilitate entrance of said ends of the laps into the notches between the teeth of gears to be lapped.

9. A tool for lapping the teeth of gears comprising a plurality of metallic laps and means supporting said laps in a substantially cylindrical array, said laps being bounded over a portion of their length from said supporting means on the side thereof facing the axis of said array by a pair of plane intersecting faces parallel to the axis of said array, said laps beyond said portion each tapering from the intersection of said pairs of faces outwardly towards one end thereof to facilitate entrance of said ends of the laps into the notches between the teeth of gears to be lapped.

10. A tool for lapping the teeth of gears comprising a plurality of elastic laps of triangular section and means rigidly supporting said laps at one end thereof in a cylindrical array, said laps having over a portion thereof extending from said supporting means by a distance not less than the thickness of a gear to be lapped a section equal to the notch to be formed between two adjacent teeth on said gear and beyond said portion, each tapering outwardly from the sides closest to the axis of said array towards the ends of the laps remote from their supported ends to facilitate entrance of said ends of the laps into the notches between the teeth of gears to be lapped, said tapered surfaces extending outwardly to a point distant from the axis of said array by more than the root radius of a gear to be lapped.

JOHN D. STRONG.

References Cited in the file of this patent

UNITED STATES PATENTS

| Number | Name | Date |
|---|---|---|
| 1,559,908 | Parsons et al. | Nov. 3, 1925 |
| 1,683,868 | Copland et al. | Sept. 11, 1928 |
| 1,781,150 | Winner | Nov. 11, 1930 |
| 1,881,382 | Wildhaber | Oct. 4, 1932 |
| 1,924,380 | Rideout | Aug. 29, 1933 |
| 1,924,736 | Fehr | Aug. 29, 1933 |
| 2,105,762 | Zimmerman | Jan. 18, 1938 |
| 2,218,786 | Candee et al. | Oct. 22, 1940 |
| 2,346,851 | Lloyd | Apr. 18, 1944 |
| 2,392,050 | Kupersmith et al. | Jan. 1, 1946 |